Dec. 10, 1968 P. L. QUANDT ETAL Re. 26,504
AUTOMATIC HITCH COUPLERS
Original Filed June 8, 1965 5 Sheets-Sheet 1
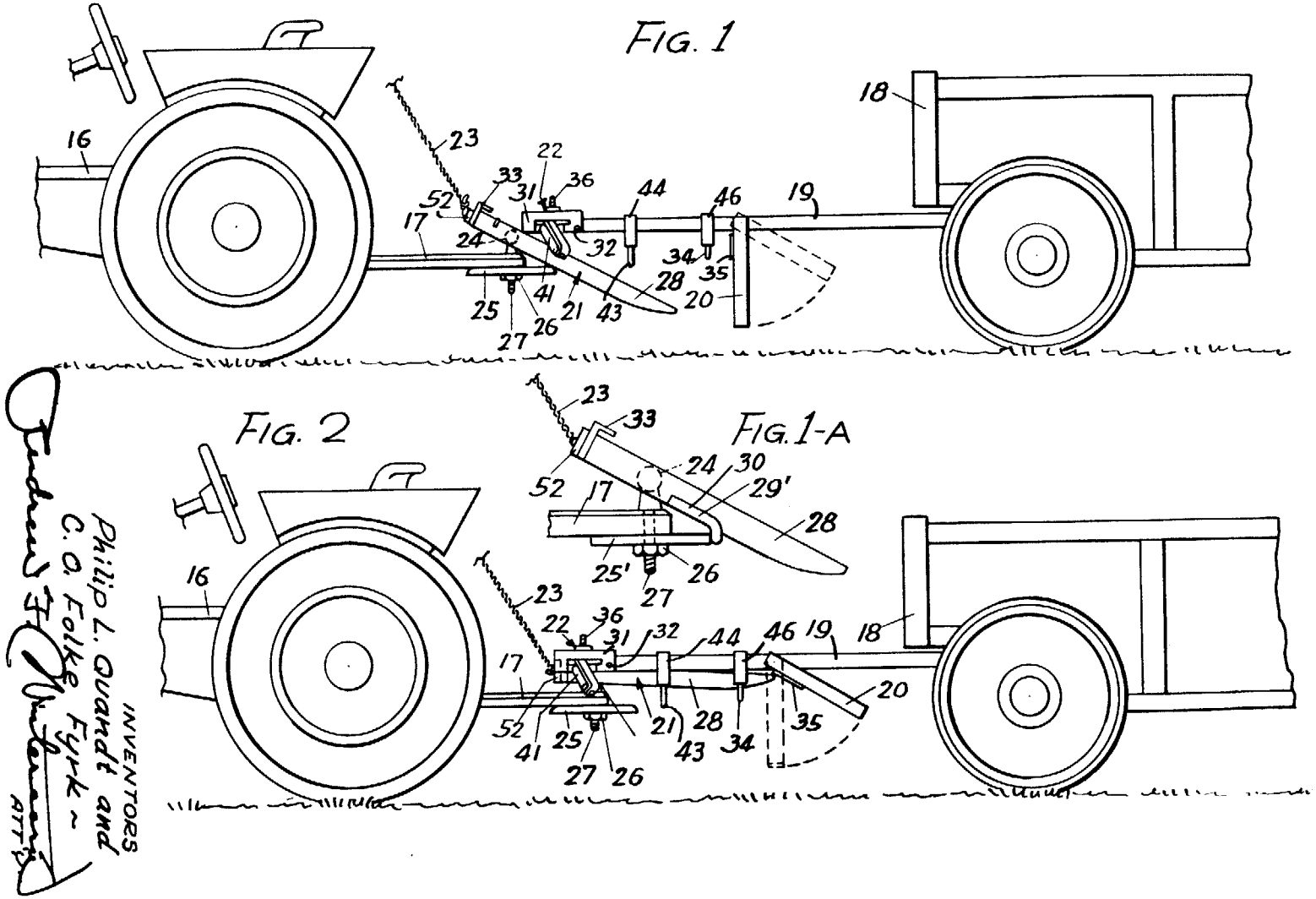
INVENTORS
Philip L. Quandt and
C. O. Folke Fyrk
Andrew F. Wintercorn
ATT'Y AUTOMATIC HITCH COUPLERS
Original Filed June 8, 1965 5 Sheets-Sheet 2
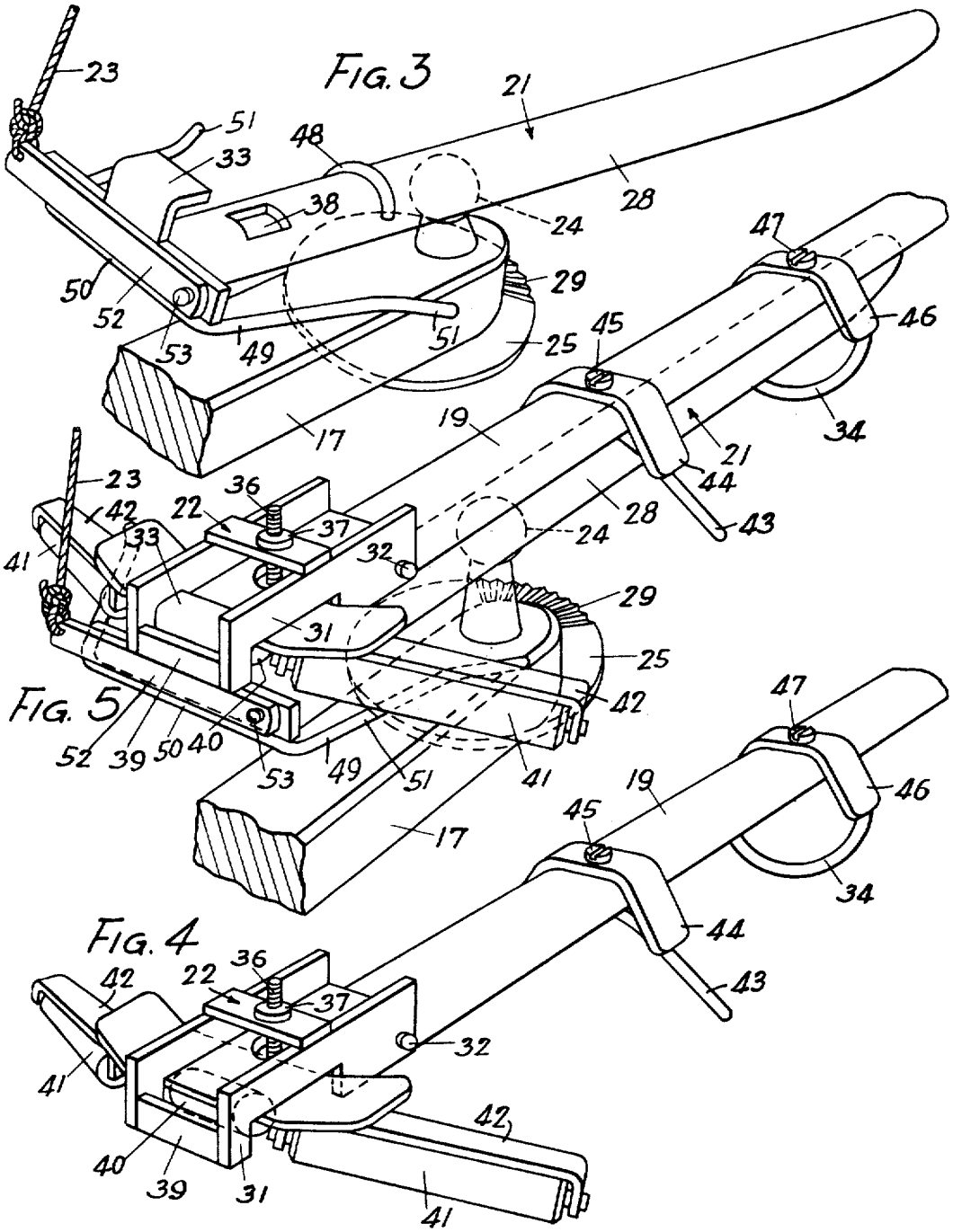
INVENTORS
Philip L. Quandt and
C. O. Folke Fyrk
ATT'Y AUTOMATIC HITCH COUPLERS
Original Filed June 8, 1965 5 Sheets-Sheet 3
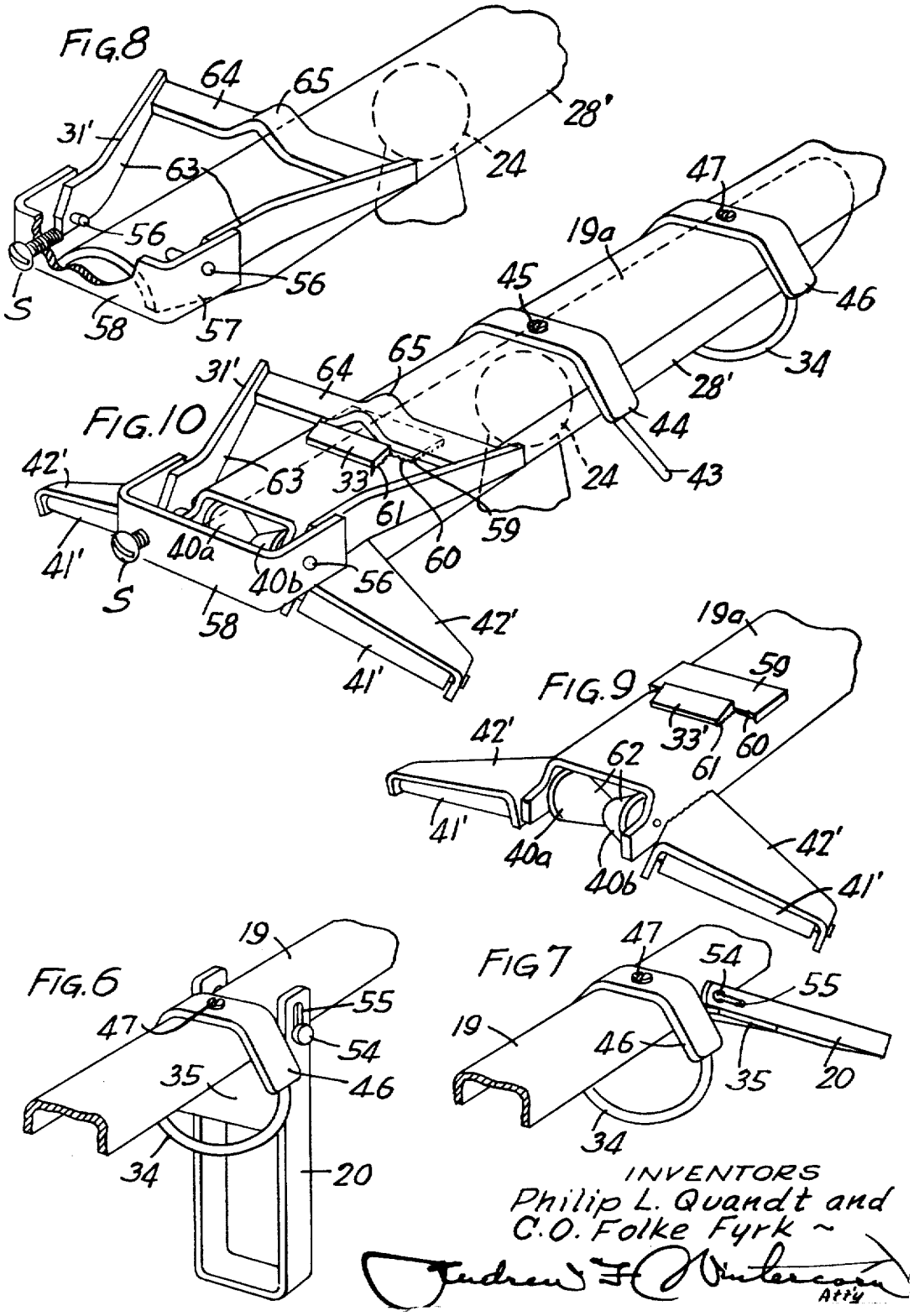
INVENTORS
Philip L. Quandt and
C.O. Folke Fyrk ~
Andrew F. Winterscom
Atty AUTOMATIC HITCH COUPLERS
Original Filed June 8, 1965 5 Sheets-Sheet 4
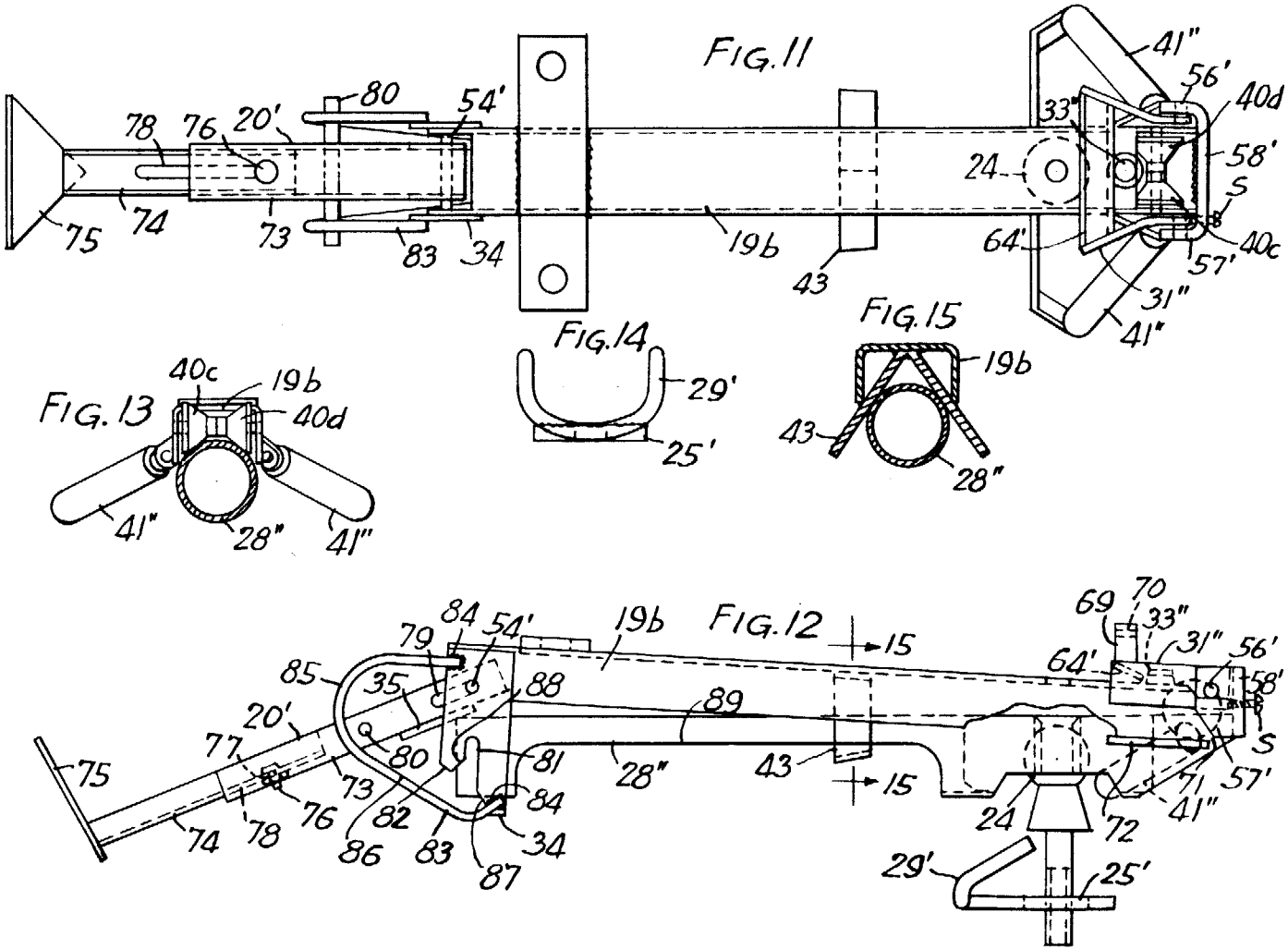
INVENTORS
Philip L. Quandt and
C. O. Folke Fyrk ~
Andrew F. Wintercorn
Att'y

AUTOMATIC HITCH COUPLERS

Original Filed June 8, 1965 5 Sheets-Sheet 5

INVENTORS
Philip L. Quandt and
C. O. Folke Fyrk
Andrew F. Vintercorn
Atty.

United States Patent Office

Re. 26,504
Reissued Dec. 10, 1968

26,504

AUTOMATIC HITCH COUPLERS

Philip L. Quandt, 724 Reynolds St. 61103, and C. O. Folke Fyrk, R.R. 4 61111, both of Rockford, Ill.

Original No. 3,319,977, dated May 16, 1967, Ser. No. 462,363, June 8, 1965. Application for reissue Apr. 25, 1968, Ser. No. 728,094

33 Claims. (Cl. 280—475)

Matter enclosed in heavy brackets [ ] appears in the original patent but forms no part of this reissue specification; matter printed in italics indicates the additions made by reissue.

33 Claims. (Cl. 280—475)

*ABSTRACT OF THE DISCLOSURE*

*An elongated ramp coupling member swivelled near its one end on one of two things to be coupled together is adapted when uncoupled to gravitate to a rearwardly and downwardly inclined position and cooperates with a coupling tongue member extending from the other thing, the tongue member having guide means on its forward end to engage and run up on the inclined ramp to center the two members relative to one another preparatory to the engagement of a latch on one of the members with a keeper on the other of said members for coupling the two things together. The tongue is supported by a prop with its front end above the level of the lower end of the ramp preparatory to the coupling operation, and the ramp is swingable upwardly toward parallelism with the tongue when the guide means running up the ramp runs forwardly over the swivel support onto the front end portion of the ramp, and finally the rear end of the ramp is detachably connected with the tongue in the final end-wise movement of the tongue and ramp members at the end of the coupling operation, holding the tongue and ramp members in aligned and substantially parallel relationship when coupled and holding the prop in a raised out of the way position.*

Our invention relates to automatic hitch couplers and has for its principal object the provision of a coupler:

(1) That enables positive coupling automatically when the tractor is merely backed into position with respect to the trailing vehicle tongue with its draw-bar in approximate alignment thereto;

(2) In which a foldable prop supporting the vehicle tongue in elevated coupling position is automatically swung rearwardly to an out-of-the-way elevated position by a ramp member in the coupling operation, and returns automatically again to vertical position in uncoupling;

(3) In which an elongated ramp member is swivelled near its front end on the tractor draw-bar and assumes an inclined position by gravity before the coupling operation to provide an incline thereon up which guide rollers disposed in an inverted V arrangement in a frame provided on the front end of the vehicle tongue are adapted to run to guide the tongue toward coupling relationship with the ramp and the ramp toward coupling relationship with the tongue, an inverted V-guide transversely of the tongue in rearwardly spaced relation to the guide rollers cooperating to locate the ramp and tongue in longitudinal alignment before the final coupling, when a latch pivoted on the front end of the ramp in our preferred form drops into place over an upward projection on the front end of the tongue, the latch, in uncoupling, being easily released by a pull on a rope held by the driver of the tractor;

(4) In which an eye or ring on the tongue receives the rear end portion of the ramp when the two parts are being coupled together to hold them in close substantially parallel relationship when coupled, and (5) In which the final relative end-wise movement between the tongue and the ramp, when the latter enters the eye on the tongue, results in the engagement of the rear end of the ramp with the pivoted upper end portion of the prop to swing it rearwardly and upwardly to an out of the way position, and, at the same time, the pivoted latch is raised by cam action to clear the keeper projection and drop behind it for the final coupling, and, although we prefer to have the latch weighted to insure its dropping into place and staying there until manually released, magnetic means may be provided on the tongue to hold the parts in coupled relation up to the time that the operator by a pull on a rope attached to the latch disengages it from the projection and uncouples the trailing vehicle.

The invention is illustrated in the accompanying drawings, in which:

FIGS. 1 and 2 are side views of a tractor and trailing vehicle showing one form of the hitch coupler of our invention in operation, FIG. 1 illustrating the relationship of the parts while the ramp on the draw-bar is still in an inclined position guiding the tongue toward coupling position by means of the rollers carried thereon, and FIG. 2 showing the completion of the coupling operation, where the prop under the tongue is swung rearwardly to an out of the way position by engagement with the rear end of the ramp;

FIG. 1–A illustrates a modification of the construction of FIGS. 1 and 2;

FIG. 3 is a perspective view related to FIGS. 1 and 2 showing the ramp carried on the draw-bar;

FIG. 4 is a perspective view also related to FIGS. 1 and 2 showing the assembly carried on the front end of the tongue of the trailing vehicle;

FIG. 5 is a perspective view showing the assembly of FIG. 4 in superimposed coupled relation to the assembly of FIG. 3;

FIGS. 6 and 7 are perspective views of the rear end portion of the assembly of FIG. 4, showing the tongue-supporting prop in the supporting vertical position in FIG. 6 and in the rearwardly deflected position in FIG. 7, as when moved to an out of the way position by engagement with the rear end of the ramp;

FIG. 8 illustrates a modification of the construction of FIG. 3;

FIG. 9 is a perspective view illustrating a modification of the construction of FIG. 4;

FIG. 10 shows the assemblies of FIGS. 8 and 9 in superimposed coupled relationship;

FIGS. 11 and 12 are a plan view and side view, respectively, of our preferred form of hitch coupler in coupled condition, the side view FIG. 12 having the side rollers shown only in dotted lines to enable better illustration of certain details on the ramp and tongue that would otherwise be hidden;

Figure 12C:
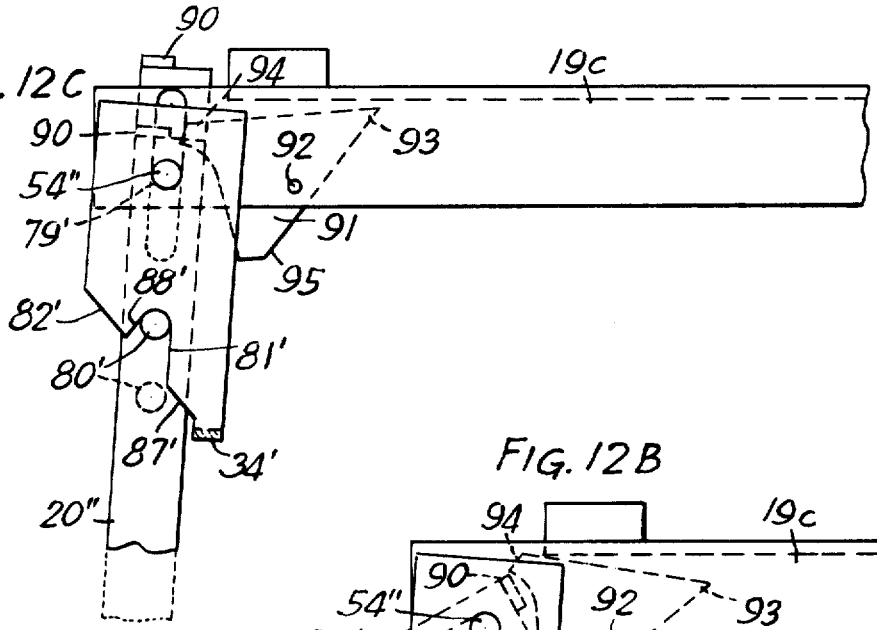
Figure 12B:
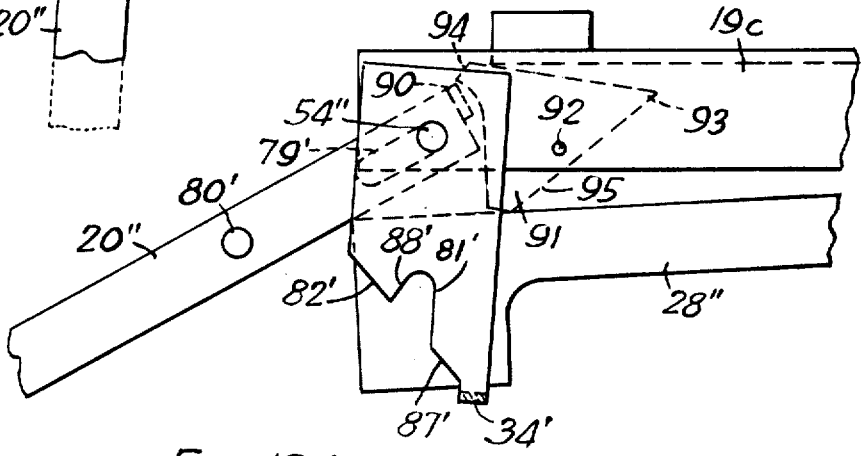
Figure 12A:
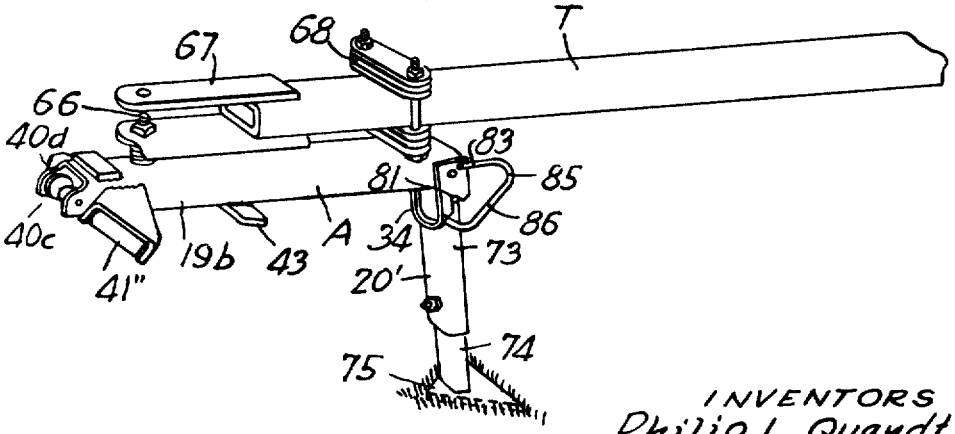

FIG. 12–A is a perspective view of the tongue and prop assembly secured to the tongue of a trailing vehicle;

FIG. 12–B corresponds to a portion of FIG. 12 but shows a stop for control of the prop in dropping in lieu of the braking means shown in FIG. 12, FIG. 12–C showing the prop in full lines in operative position and in dotted lines before reaching that position;

FIG. 13 is an end view of FIG. 12 with the latch and its mounting bracket omitted;

FIG. 14 is a rear view of the U-shaped yoke of FIG. 12, and

FIG. 15 is a section on line 15—15 of FIG. 12.

Similar reference numerals are applied to corresponding parts throughout the views.

Referring to the drawings, and at first only to FIGS. 1 to 7, the reference numeral 16 designates a tractor having the usual draw-bar 17 extending rearwardly therefrom, while 18 designates the trailing vehicle having a forwardly extending tongue 19 to be detachably coupled or hitched to the draw-bar 17. Tongue 19 has a prop 20 pivotally mounted on its front end portion for support of the tongue in elevated relation to the ground preliminary to the coupling or hitching operation. Draw-bar 17 has the hitch coupler assembly indicated at 21 mounted thereon and arranged to cooperate with the coupler assembly indicated at 22 provided on the front end of the tongue 19 so as to couple the tongue 19 to the draw-bar 17 and at the same time swing the prop 20 upwardly and rearwardly to an out-of-the-way position as it is shown in full lines in FIG. 2, so that it is out of the way while the trailing vehicle is being pulled, but is nevertheless in readiness to drop down into tongue-supporting position again whenever the operator, riding on the tractor 16, pulls the rope 23 to uncouple the trailing vehicle.

A ballhead 24 is secured to the draw-bar 17 and projects vertically upwardly therefrom centrally with respect to a circular plate 25 that is secured to the bottom of the draw-bar by means of a nut 26 threaded on the downwardly projecting shank portion 27 of the ballhead, the plate serving as a rest for the ramp 28 which forms a part of the coupler assembly 21 and in which a socket is provided swivelled on the ballhead 24 to allow free swinging of the ramp 28 and tongue 19 relative to the draw-bar. Radial corrugations 29 on the top of the plate 25 serve to hold the ramp 28 in a fixed position and prevent it from swinging laterally about the ballhead and thereby interfering with proper coupling action. In lieu of the corrugated plate 25 we may, as shown in FIG. 1–A, use a plate 25' having welded to the rear end thereof a generally U-shaped yoke 29' between the two forwardly inclined arms 30 of which the ramp 28 can be positively located in one fixed position aligned with the draw-bar 17 on the longitudinal center line of the tractor when disposed in the inclined position shown in FIG. 1, ready for coupling the tongue 19 to the draw-bar. In uncoupling the trailing vehicle while the tractor draw-bar is at an acute angle to the tongue, the arms 30, due to their forward inclination, center the ramp 28 with respect to the draw-bar. With either construction, there is a latch 31 pivoted transversely of the front end of the tongue 19, as at 32, and arranged to be dropped down over an upward keeper projection 33 provided on the front end of the ramp 28 when the tongue 19 and ramp 28 are in longitudinally aligned superimposed parallel relation with the rear end of ramp 28 projecting through an eye 34 provided on and projecting downwardly from tongue 19 in rearwardly spaced relation to the latch 31, the ramp 28 in this position engaging a plate 35 on the prop 20 and holding the latter in a raised retracted position, as seen in FIG. 2.

A vertical pin 36, which may be fixed but is here shown as threadedly adjustable with respect to the latch 31, as indicated at 37, projects downwardly from the latch to support it in raised position while it slides along the top of the ramp 28 in the coupling operation until it reaches the hole 38 provided in the front end portion of the ramp located forwardly of the ballhead 24 and in rearwardly spaced relation to the projection 33, when, of course, the latch 31, which has meanwhile been held in a raised position so as to have its cross-portion 39 on the front end clear the keeper projection 33, is free to drop down in front of the projection and complete the coupling operation. Then the load in pulling the vehicle 18 with the tractor 16 is assumed by this cross-portion 39 on the latch 31 in surface-to-surface engagement with the projection 33, as seen in FIG. 5. Before the pin 36 encounters the ramp 28 and raises the latch 31, a roller 40 that is mounted horizontally in the front end of the tongue 19 in the same manner as rollers 40a and 40b in tongue 19a in FIG. 9 is adapted to run along the center line of the ramp 28 to support and guide the front end of the tongue 19 on the ramp 28. This roller 40 is disposed between the front ends of two rearwardly diverging and downwardly inclined guide rollers 41 that are mounted in yokes 42 fixed to the front end of the tongue 19 on opposite sides thereof, similarly as yokes 42' for rollers 41' in FIG. 9, so that the rollers 41 are adapted to run along opposite sides of the ramp 28 and thereby guide the front end of the tongue 19 into longitudinal alignment with the ramp, it being obvious that the driver on the tractor may not back the tractor so accurately on a straight line with the tongue 19 as to make such guiding by rollers 41 unnecessary. An inverted V defined by two rods 43 welded or otherwise suitably secured to the tongue 19 in rearwardly spaced relation to the latch 31 and also welded to an inverted V-clip 44 suitably secured to the tongue 19, as by screw 45, serves by engagement with one or the other side of the ramp 28 to swing the tongue 19 and ramp 28 into longitudinal alignment with one another. The eye 34 previously mentioned is welded in place on the tongue 19 by a similar inverted V-clip 46 that is fastened to the tongue 19, as by another screw 47.

In operation, when the tractor 16 is backed up toward the front end of vehicle tongue 19, the ramp 28 is disposed resting on corrugated plate 25 in the inclined position shown in FIG. 1 and it first encounters the three rollers 40 and 41 to center the front end of the tongue 19 with respect to the ramp 28. The tractor backing up farther causes the pin 36 to strike and slide along the top of the ramp 28 thereby holding the latch 31 raised so that the front end 39 thereof will be elevated enough in relation to the keeper projection 33 on the front end of the ramp to pass over it when the latch reaches the front end of the ramp, and, at that point, the pin 36 drops into the hole 38 so that the latch drops down into latched position with the cross-portion 39 thereof disposed in front of projection 33 to assume the load in pulling the trailing vehicle by means of tongue 19. While gravity alone is usually sufficient to insure the latch 31 dropping into place, especially when it is weighted sufficiently, a tension spring or torsion spring (not shown) may be provided to force it down. When the roller 40 passes the ballhead 24, the front end of the ramp is forced down under the weight of the tongue and at this point the wire V-guide 43 may engage one or the other side of the ramp 28 to bring the tongue 19 and ramp 28 into the desired longitudinal alignment, and, just prior to the latch 31 dropping into place over the projection 33, the rear end of the ramp 28 passes through the eye 34 and strikes the plate 35 to swing the prop 20 upwardly to an out-of-the-way position, as seen in FIG. 2. A small semi-circular rib 48 may be provided on the top of ramp 28 forwardly of the ballhead 24 to cause enough downward thrust against the front end portion of the ramp by the roller 40 to start the ramp 28 swinging downwardly from its inclined position toward the horizontal position, although, of course, when the roller 40 passes the ballhead 24 this would tend to occur anyway, the only reason for the provision of ridge 48 being to give an extra impetus to the swinging of the ramp 28 toward horizontal position immediately, because it is so important that there be no lag as the rear end of the ramp 28 is arranged at the same time to enter the eye 34 provided on the tongue 19 in rearwardly spaced relation to the V-guide 43. Once the ramp 28 has been raised off the corrugations 29, it also becomes necessary to hold it against lateral tilt on its longitudinal axis and this we accomplish by providing at the front end of the ramp the U-shaped yoke 49 suitably secured to the ramp by means of its cross-portion 50 and having downwardly and rearwardly diverging arms 51 arranged to engage one or the other of the rollers 41 and thereby square up the ramp 28 with the tongue 19, as should be clear from a study of FIG. 5, where the two arms 51 are shown engaged under the two rollers 41. The trailing vehicle 18 remains coupled to the tractor 16 until the operator pulls upwardly on rope 23 to swing a lever 52 upwardly on its pivot 53 at one end and thereby lift the front end 39 of the latch 31 clear of the lug 33, whereupon the tongue 19 is disconnected from the ramp 28 so that the tractor can pull away from the vehicle. As soon as the ramp 28 is withdrawn from its position holding the prop 20 in the raised retracted position seen in FIG. 2, the prop 20 drops back again to the vertical position shown in full lines in FIG. 1 and is ready to support the tongue 19 again in the raised position ready for the next coupling operation as soon as the ramp 28 moves away from rollers 40 and 41. As seen in FIGS. 6 and 7, the prop 20 is pivoted at its upper end on the tongue 19 by means of pins 54 extending through elongated slots 55 that extend lengthwise of the prop, the pins having square shanks which when disposed in the narrower lower ends of the slots 55 hold the prop 20 against pivotal movement, as in FIG. 6, but allow the prop 20 to swing freely with respect to the pins when they are engaged in the upper ends of the slots, as in FIG. 7, when the prop is suspended from the tongue and can be swung rearwardly by engagement of the rear end of the ramp 28 with the plate 35, as previously described.

The other construction illustrated in FIGS. 8 to 10 is closer to our preferred construction of FIGS. 11–15 and differs from the construction of FIG. 1 mainly in reversing the arrangement of the latch and its keeper projection, and in providing magnetic means for holding the latch in its coupled position. Thus, the latch 31' is pivoted, as at 56, on the rearwardly bent end portions 57 of a cross-piece 58 that is welded or otherwise suitably secured to the front end of the ramp 28', while the wedge shaped keeper projection 33' is provided on the front end portion of the tongue 19a in front of a permanent magnet 59 that is set in a slot 60 extending transversely of the top wall of the channel shaped tongue 19a and suitably welded in place therein. The keeper projection 33' is also suitably welded in place, as indicated at 61. The two rollers 40a and 40b, as seen in FIG. 9, give an hour-glass shaped assembly so that the inwardly converging conical surfaces 62 riding along the curved top of the ramp 28' will center the front end portion of the tongue 19a as it rides up on the ramp in the coupling operation and initiate the horizontal as well as vertical movement of the ramp, the inverted V-guide 43 cooperating by engagement on one or the other side of the ramp to cause the tongue and ramp to be brought into longitudinal alignment. The rearwardly diverging side members 63 of the latch 31' also help by engaging one or the other side of the tongue 19a to right the ramp 28' if it has cocked on its longitudinal axis one way or the other relative to the ballhead 24. The keeper projection 33' rides under the cross-portion 64 of the latch 31' just prior to the completion of the coupling operation, the coupling operation being completed, of course, when the cross-portion 64 of the latch drops down into place behind the projection 33' and against or close to the magnet 59. The latter serves to hold the latch in its locked position until the latch is raised manually, similarly as in the first form, namely, by a pull on the rope 23 that can be attached to either end of the cross-portion 64 of the latch or to its upwardly bent middle portion 65. A screw S threaded in a hole in the cross-piece 58 is adjustable on a line with one end of latch 31' below the pivot 56 to engage the latch and raise or lower it relative to the top of the keeper projection 33' to vary the resistance afforded by the latch to movement of the tongue when the center rollers pass the ballhead 24 so as to help swing the ramp upwardly and laterally into the final coupling position substantially parallel to the tongue. In other words, by adjusting the screw S we can vary the impetus, whereas with a ridge 48 the impetus is fixed.

The operation of this construction is substantially the same as that of the other construction previously described and hence it is hardly necessary to point out that at the point where the ramp 28' becomes longitudinally aligned with the tongue 19a and is ready for the completion of the coupling operation, the ramp 28' has its rear end projecting through the eye 34 and arranged to strike the plate 35 on the prop 20 to swing it in its suspended condition rearwardly and upwardly to the retracted position shown in full lines in FIG. 2. The rollers 41' serve by engagement with one or the other side of the ramp to swing the tongue toward alignment with the ramp when the tractor approaches the tongue either off-line or at an acute angle relative thereto, and, soon thereafter, the V-guide 43 by contacting one or the other side of the ramp 28' causes the two parts 19a and 28' to be swung into closer longitudinal alignment to enable a good coupling action.

Our preferred construction is illustrated in FIGS. 11 to 15 where we have shown in FIG. 12–A the tongue member of our improved coupling as an attachment A to an existing tongue T. In other words, what corresponds to the tongue 19 in FIG. 1 is the part 19b of relatively short length that is bolted, as indicated at 66, to the clevis 67 of tongue T at the forward end, and is clamped, as indicated at 68, at its rear end to the tongue, the bolted connection 66 being coaxially aligned vertically with the ballhead 24 in the ramp 28'', so that the end result after coupling is the same as if the tongue T had its clevis 67 bolted directly to the draw-bar 17 in the conventional manner. That is important because of the necessity with certain implements to maintain a specified spaced relationship between the tractor and the trailing vehicle. The front end of the present assembly closely resembles the construction of FIGS. 8 to 10 in that the latch 31'' is pivoted, as at 56', to the rearwardly bent end portions 57' of a cross-piece 58' that is welded or otherwise suitably secured on the front end of the ramp 28''. The latch 31'' has an inclined cross-portion 64' on the rear end thereof arranged to engage the top portion of a keeper projection 33'' provided on the front end of the tongue member 19b so as to be raised first and then drop into coupling position behind said projection, a fairly heavy weight 69 on the rear end portion of the latch making it quite certain that the latch will drop firmly in place behind the projection and stay there once the coupling operation has been completed, so that there is no need for a magnet, like that shown at 59 in FIGS. 9 and 10, to hold the latch in locked position. The weight also adds appreciable resistance to the relative movement between the tongue and ramp members just prior to the coupling action being completed, whereby to give added impetus to the swinging upwardly of the ramp into substantial parallelism with the tongue, and, in order to vary this impetus, a screw S may be provided as in FIG. 8. A hole 70 provided in the weight 69 at one end provides a place for attaching the rope, like that shown at 23 in FIG. 1, for the operator to use in raising the latch to disconnect the tractor from the trailing vehicle. The tongue member 19b has a pair of rollers 40c and 40d, similar to the hour-glass shaped assembly of rollers mounted in its front end portion to center the tongue member 19b with respect to the ramp 28'' as soon as the latter comes into contact with these rollers as the tractor is backed up toward the tongue T. The downwardly and rearwardly diverging rollers 41'', also carried on the front end of the tongue member 19b on opposite sides of the central rollers 40c and 40d, serve to center these rollers on the tongue with respect to the ramp if the latter is off line or at an angle relative to these rollers in the backing up of the tractor in the first part of the coupling operation. The ramp 28'', it must be remembered, is disposed in the inclined position shown in FIGS. 1 and 1–A and is at first held rigidly against lateral displacement by engagement in the yoke 29' supported on the draw-bar 17 by plate 25''. When the ramp 28'' is swung upwardly by engagement of rollers 40c and 40d thereon up near the ballhead 24 and the ramp swings toward its horizontal position shown in FIG. 12, the downwardly diverging guide rods 43 on the tongue 19b cooperate with the central rollers 40c and 40d to bring the tongue 19b and ramp 28'' into longitudinal alignment, but should the ramp 28'' be slightly cocked on its longitudinal axis in this part of the coupling operation, it is quickly righted by the sliding engagement of one or the other of the inclined surfaces 71 provided on both sides of the front end portion of the tongue 19b with one or the other of elongated guide projections 72 that are provided on the opposite sides of the ramp 28'' longitudinally of its front end portion, such guide projections being in the form of rods welded or otherwise suitably secured to the ramp. While the inclined surfaces 71 are riding on the guides 72, the rear end portion of ramp 28'' is entering the eye 34 provided on the rear end portion of the tongue member 19b to maintain interlocked substantially parallel relationship of the two parts 19b and 28'' when the coupling operation is completed by latch 31'' dropping behind keeper projection 33'. Of course, when ramp 28'' enters the eye 34, it strikes the plate 35 on the prop 20' and swings the latter rearwardly and upwardly to the retracted position shown in FIG. 12.

Prop 20', which is made in two telescoping longitudinally adjustable sections 73 and 74 with a pad 75 on the lower end of the inner section, the two sections arranged to be clamped securely in adjusted relationship by means of a bolt 76 entered in a hole 77 in the outer section 73 and in a registering slot 78 provided in the inner section 74, has registering slots 79 in the opposite sides of the upper end portion thereof receiving a cross-pin 54' for slidably pivotally mounting the prop on the rear end of the tongue member 19b. The eye 34 previously mentioned is welded or otherwise suitably secured to the tongue member 19b. A second cross-pin 80 is provided in the upper section 73 of the prop in downwardly spaced relation to pin 54', and, when the ramp 28'' is withdrawn from the eye 34, pin 80 enters registering slots 81 provided in the opposite sides of the eye 34, the latter being cut away on both sides, as indicated at 82, to allow free access for the pin 80 to the slots 81 between the eye 34 and two generally U-shaped wire frames 83 that are welded or otherwise suitably secured by the ends of their arms to the opposite sides of the eye 34, as indicated at 84. The arcuate rear portions 85 of the frames 83 allow ample working clearance for the cross-pin 80 inside the frames 83 when the prop 20' is swung upwardly and rearwardly to the retracted postion seen in FIG. 12 and, of course, that is necessary if the prop 20' is to swing freely around the pin 54' as a center while suspended on the pin 54', namely, when the tongue member 19b is raised by the running up of rollers 40c and 40d on ramp 28'' in the coupling operation. When the tongue 19b is uncoupled by release of the latch 31'', and the tongue 19b moves to the rear with respect to ramp 28'', prop 20' obviously is free to swing downwardly by gravity toward its substantially vertical operative position again, and, inasmuch as this uncoupling operation usually occurs rather quickly, the prop 20', if not subjected to enough braking action, would be apt to swing down with such speed as to be subject to a certain amount of rebound when the prop 20' struck the eye 34, and it is for that reason that we provide elongated straight braking portions 86 on the lower side of frames 83 between the arcuate rear portions 85 and slots 81, these braking portions 86 being closer to the pivot pin 54' than the portions 85 of frames 83 so as to cause the pin 80 in riding on the portions 86 to lift the prop 20' relative to pivot pin 54' and thus slow the prop 20' down sufficiently so that when the cross-pin 80 is in vertical alignment with slots 81, or nearly so, there will be no rebound and the pin 80 will be certain of entering the slots 81 as the tongue 19b is lowered with the tongue T, whereby to support the tongue and its attachment A on the prop 20'. If the cross-pin 80 does not happen to be exactly aligned vertically with the slots 81 it will ride up into the slots 81 either on the inclined lower edge portions 87 or 88 of the cut-away portion 82 of the eye 34. Of course, when the pin 54' bottoms in the lower ends of the slots 79, the cross-pin 80 can rise no farther in slots 81, and, hence, the tongue assembly of tongue T and attachment A is adequately supported by the prop 20'. Two features which contribute toward good performance of this construction are:

(1) The cutting away of a good portion of the ramp 28', as indicated at 89 in FIG. 12, to reduce the weight of that portion behind the ballhead 24 to the point where, due to the added weight of the weighted latch 31'', plus the additional weight of the heavy front plate 58' and the roller assembly (and some extra weight if needed), the ramp 28' is only slightly heavier to the rear of ballhead 24 and, therefore, being nearly balanced relative to said ballhead, can be easily tilted on the ballhead as a fulcrum in coupling regardless of its overall weight, and (2) The latch 31'', which may or may not include the screw adjustment S shown in FIGS. 8 and 10, to predetermine the elevation of the inclined rear cross-portion 64' relative to the keeper projection 33'', is pivoted at 56' below the level of the keeper projection to insure a better hold of the latch on the keeper projection as the forward pull on the latch in pulling a trailing vehicle with the tractor has a downward component, thereby making a holddown spring or magnet unnecessary.

This preferred form operates very much the same as the modified form of FIGS. 8 to 10.

While we have shown rollers 40 and 41 in FIGS. 1 to 7, rollers 40a–40b with 41' in FIGS. 8 to 10, and rollers 40c–40d with rollers 41'' in FIGS. 11 to 15, it should be understood that we do not wish to be limited to such guide means, inasmuch as a yoke may be provide on the end of the tongue providing guide surfaces thereon similarly arranged with respect to one another as the central and outboard rollers, where for example, a more economical construction is desired, or where the application of the coupling does not require anti-friction roller guide means and sliding movement of the tongue and ramp members with respect to one another is satisfactory. Also, whereas we have shown latches 31, 31', and 31'' which in each instance engage a keeper projection, and we have indicated that magnetic means or spring means may be employed to hold the latch in coupled relationship to the keeper projection, and we have also disclosed a weight 69 on the rear end portion of the latch to insure its dropping more firmly in place behind the keeper projection and staying there once the coupling operation has been completed, we do not wish to limit our invention to these variations, even though for practical use in the field they are considered sufficient, but we contemplate that possibly, where the trailing vehicle may be hauled on the highway, legal requirements may necessitate positively locking the latch in its coupled position, as, for example, by providing a hold-down member on the draw-bar 17 in FIG. 2 movable from a retracted position, either longitudinally of the draw-bar or pivotally with respect thereto, to an operative position extending over a portion of the latch 31 to hold it in its coupled position.

In conclusion, referring to FIGS. 12–B–12–C, 20'' designates another prop slidably pivotally connected, as at 54'', to the tongue member 19c, the pivot pin 54'' extending through elongated slots 79' provided in the upper end portion of the prop, in downwardly spaced relation to a cross-bar 90 rigid with the upper end of the prop. The prop has a cross-pin 80' in downwardly spaced relation to the slots 79' and arranged to engage in slots 81' provided in opposite sides of the eye 34', the back portion of the eye being cut away at an angle, as shown at 82', to provide inclined edges 87' to guide the pin 80' into the slot 81' from one side, while the slot has its lower end widened as at 88' to provide similar guides on the other side to enable easy entry of the pin into the slots 81' in the event the pin does not happen to be directly in line vertically with the slots when the tongue 19c comes down to rest on the prop after an uncoupling operation. In this form, a generally triangular shaped retractable stop plate 91 that is pivotally mounted between the side walls of the channel-shaped tongue member 19c, as at 92, off-center, so that the stop normally drops by gravity to the position shown in FIG. 12–C with its apex 93 engaging the top wall of the tongue 19c, and with a tooth 94 disposed in the path of the cross-bar 90 when the prop 20'' suspended on pins 54'' swings down by gravity toward a vertical position immediately after uncoupling, as shown in the dotted line position of bar 90 in FIG. 12–C, whereby to limit the rebound of the prop 20'' when it strikes the back of the eye 34' and the bar 90 engages the tooth 94 on the rebound. Stop 91 is swung upwardly to a retracted position with respect to the cross-bar 90 by engagement of the rear end of the ramp 28'' on the inclined surface 95 on the front of the stop as the rear end of the ramp enters the eye 34' and swings the prop 20'' upwardly and rearwardly to a retracted position in the coupling operation. Thus, there is no interference whatsoever with the rearward swinging of the prop 20'' by engagement of the ramp 28'' with its pivoted upper end portion, and that is quite important where the trailing vehicle is fairly light and might, therefore, be apt to be rolled to the rear if it required a fairly heavy push on the tongue 19c to swing the prop 20'' to the rear and upwardly to a retracted position. The operation with this prop 20'' is otherwise the same as with the prop 20' shown in FIGS. 11 and 12.

It is believed the foregoing description conveys a good understanding of the objects and advantages of our invention. The appended claims have been drawn to cover all legitimate modifications and adaptations.

We claim:

1. In an automatic coupling, the combination of an elongated ramp coupling member swivelled near its one end on one of two things to be coupled together and adapted when uncoupled to gravitate to a rearwardly and downwardly inclined position, a coupling tongue member extending from the other thing, guide means on the forward end of said tongue to engage and run up on the inclined ramp to center the two members relative to one another, one of said tongue and ramp members having a keeper [projection on its forward end portion,] *thereon*, a latch [pivoted on a horizontal axis transversely relative to] *carried on* the [front end portion of the] other of said members and arranged to [hook over said projection] *engage said keeper* to couple said members and thereby couple said two things together, said tongue being disposed with its front end above the level of the lower end of said ramp preparatory to the coupling of said members, said ramp being swingable upwardly toward parallelism with said tongue when said guide means running up said ramp runs forwardly over the swivel support onto the front end portion of said ramp in the coupling operation, and [an eye extending downwardly from the tongue in such rearwardly spaced relation to said keeper projection and latch in relation to the length of said ramp that the rear end portion of said ramp is engageable in said eye] *means for detachably interconnecting the rear end portion of said ramp with said tongue* in the final relative endwise movement of the tongue and ramp members at the end of the coupling operation to hold the tongue and ramp members in aligned and substantially parallel relationship when coupled.

2. An automatic coupling as set forth in claim 1 including a second guide means on the tongue between said first mentioned guide means and [said eye] *said last mentioned means* to engage said ramp intermediate its ends to align the ramp and tongue members with respect to one another during the coupling operation.

3. An automatic coupling as set forth in claim 1, including means on the first mentioned thing detachably engageable by the ramp in its inclined position to hold it against lateral displacement during the first part of the coupling operation.

4. An automatic coupling as set forth in claim 1, including a yoke on the first mentioned thing in which the ramp is fixed in its inclined position disposed on the longtiudinal center line of the first mentioned thing and held against lateral displacement during the first part of the coupling operation.

5. An automatic coupling as set forth in claim 1, including a yoke on the first mentioned thing in which the ramp is fixed in its inclined position disposed on the longitudinal center line of the first mentioned thing and held against lateral displacement during the first part of the coupling operation, said yoke being generally U-shaped and forwardly inclined so that the forwardly inclined arms on opposite sides of the U [serves] *serve* as guides to guide the ramp back to its initial central position when it is free to return to its initial inclined position after uncoupling.

6. An automatic coupling as set forth in claim 1, including a prop pivoted at its upper end to and supporting the tongue elevated off the ground perparatory to the coupling operation, said prop being so disposed relative to said [eye] *last mentioned means* and the rear end of said ramp in its coupled position that the rear end of said ramp engages and swings the prop rearwardly and upwardly to an out of the way position in the coupling operation.

7. An automatic coupling as set forth in claim 1, including a prop pivoted at its upper end to and supporting the tongue elevated off the ground preparatory to the coupling operation, said *prop* being so disposed relative to said [eye] *last mentioned means* and the rear end of said ramp in its coupled position that the rear end of said ramp engages and swings the prop rearwardly and upwardly to an out of the way position in the coupling operation, and means for holding the prop against pivotal movement while it is supporting the tongue, said prop being free to have pivotal movement when said prop is suspended from said tongue.

8. An automatic coupling as set forth in claim 1, including a prop pivoted at its upper end to and supporting the tongue elevated off the ground preparatory to the coupling operation, said prop being so disposed relative to said [eye] *last mentioned means* and the rear end of said ramp in its coupled position that the rear end of said ramp engages and swings the prop rearwardly and upwardly to an out of the way position in the coupling operation, and braking means to resist swinging of said prop upon uncoupling when said prop drops by gravity toward its vertical operative position, whereby to reduce its rebound.

9. An automatic coupling as set forth in claim 1, including a prop pivoted at its upper end to and supporting the tongue elevated off the ground preparatory to the coupling operation, said prop being so disposed relative to said [eye] *last mentioned means* and the rear end of said ramp in its coupled position that the rear end of said ramp engages and swings the prop rearwardly and upwardly to an out of the way position in the coupling operation, and stop means to control swinging of said prop upon uncoupling when said prop drops by gravity toward its vertical operative position, whereby to reduce its rebound, said stop means being retractible during the coupling operation upon [entry of the rear end of said ramp in said eye] *detachable connection of the rear end of said ramp with said tongue* so as to allow free swinging of said prop to raised retracted position.

10. An automatic coupling as set forth in claim 1 including a weight on the latch holding it in engagement with the keeper projection while also contributing toward better balance of said ramp on its swivel support, the latch being swingable out of such engagement manually in uncoupling.

11. An automatic coupling as set forth in claim 1 including magnetic means for holding the latch in engagement with said keeper projection, said latch being disengageable manually in uncoupling.

12. An automatic coupling as set forth in claim 1 wherein *the keeper is in the form of a projection and the latch*

*is pivoted on a horizontal axis transversely relative to its supporting member and is arranged to hook over said projection in the coupling operation, and wherein* the latch in the relative endwise movement of said ramp and tongue members is cammed upwardly upon arrival at the keeper projection in the coupling operation to clear said projection and drop behind it to complete the coupling.

13. An automatic coupling as set forth in claim 1 wherein *the keeper is in the form of a projection and the latch is pivoted on a horizontal axis transversely relative to its supporting member and is arranged to hook over said projection in the coupling operation, and wherein* the latch in the relative endwise movement of said ramp and tongue members is cammed upwardly upon arrival at the keeper projection in the coupling operation to clear said projection and drop behind it to complete the coupling, there being adjustable stop means to predetermine the initial level of said latch in relation to the top of said keeper projection.

14. An automatic coupling as set forth in claim 1, wherein said ramp by virtue of its swivel support on the first mentioned thing is free to cock to one side or the other about its longitudinal axis, there being guide means extending laterally from the front end portion of said tongue to engage one or the other side of said ramp to right it from a cocked position in the course of the coupling operation.

15. An automatic coupling as set forth in claim 1, wherein said ramp by virtue of its swivel support on the first mentioned thing is free to cock to one side or the other about its longitudinal axis, there being guide means extending laterally from the front end portion of said tongue to engage one or the other side of said ramp to right it from a cocked position in the course of the coupling operation, said guide means comprising cam surfaces on the opposite sides of the front end portion of one of said tongue and ramp members, and lateral projections on the opposite sides of the other of said tongue and ramp members arranged to be slidably engaged by said cam surfaces to right said ramp if cocked and hold the same righted.

16. An automatic coupling as set forth in claim 1 wherein the keeper projection is on one of the tongue and ramp members and engages under the latch which is pivoted on the other of said members, and one of said latch and keeper projection is cam shaped whereby the latch is cammed upwardly out of the way in the interengagement of the latch and keeper projection in the relative endwise movement of the ramp and tongue members in the completion of the coupling operation to automatically engage the latch behind the keeper projection when the coupling operation is completed.

17. An automatic coupling as set forth in claim 1 wherein the keeper projection is on one of the tongue and ramp members and engages under the latch which is pivoted on the other of said members, and one of said latch and keeper projection is cam shaped whereby the latch is cammed upwardly out of the way in the interengagement of the latch and keeper projection in the relative endwise movement of the ramp and tongue members in the completion of the coupling operation to automatically engage the latch behind the keeper projection when the coupling operation is completed, there being magnetic means adjacent said keeper projection cooperating with the latch to hold it releasably in coupled position, the latch being movable manually to uncoupled position.

18. An automatic coupling as set forth in claim 1 wherein *the keeper is in the form of a projection on the front end portion of the ramp and the latch is pivoted on a horizontal axis transversely relative to the front end portion of the tongue, and wherein* the ramp has an opening provided in the front end portion thereof forwardly from the swivel support adapted for reception of a pin projecting downwardly from the latch, the latch carrying a downwardly projecting pin which in the running up of the guide means on the ramp holds the latch raised so as to clear the keeper projection as it slides along on top of the ramp until it drops into the opening upon arrival of the latch at the coupling position, the latch being swingable upwardly manually to an uncoupled position.

19. An automatic coupling as set forth in claim 1 wherein *the keeper is in the form of a projection on the front end portion of the ramp and the latch is pivoted on a horizontal axis transversely relative to the front end portion of the tongue, and wherein* the ramp has an opening provided in the front end portion thereof forwardly from the swivel support adapted for the reception of a pin projecting downwardly from the latch, the latch carrying a downwardly projecting pin which in the running up of the guide means on the ramp holds the latch raised so as to clear the keeper projection as it slides along on top of the ramp until it drops into the opening upon arrival of the latch at the coupling position, the latch being swingable upwardly manually to an uncoupled position, and a trip lever pivoted with respect to the front end of the ramp and disposed under the latch when it is hooked over the keeper projection to couple the tongue and ramp members, said trip lever being raisable manually to release the latch from the keeper projection.

20. An automatic coupling as set forth in claim 1, including auxiliary elongated guide means extending laterally and inclined downwardly and rearwardly on opposite sides of said first mentioned guide means for engagement with [on] *one* or the other side of said ramp in the initial inter-engagement of the tongue and ramp members at the commencement of the coupling operation to shift the front end of the tongue into alignment with said ramp and get said first mentioned guide means running on said ramp.

21. An automatic coupling as set forth in claim 1, including auxiliary guide means extending laterally and inclined downwardly on opposite sides of said first mentioned guide means for engagement with one or the other side of said ramp in the initial inter-engagement of the tongue and ramp members at the commencement of the coupling operation to shift the front end of the tongue into alignment with said ramp and get said first mentioned guide means running on said ramp.

22. An automatic coupling as set forth in claim 21, wherein both of said guide means comprises anti-friction rollers.

23. An automatic coupling as set forth in claim 21, wherein both of said guide means [comprises] *comprise* anti-friction rollers, the rollers of the first-mentioned means defining an hour-glass assembly, which in rolling on a rounded top provided on said ramp member causes centering of the tongue relative to said ramp, and when said first mentioned guide means passes the swivel support also causes the alignment of said ramp to said tongue [members,] *member.*

24. An automatic coupling as set forth in claim 1, wherein said ramp has the major portion of its length to the rear of the swivel support therefor and is cut away on its rear portion to reduce the weight of that portion to closer balance of the rear portion with respect to the front portion for easier swinging upwardly of said ramp toward the substantially horizontal coupled position, the rear portion being heavier than the front portion to assure holding the inclined position until the coupling operation gets under way.

25. An automatic coupling as set forth in claim 1, wherein said prop is slidable vertically relative to said tongue to and from tongue supporting position by means of vertically spaced parallel horizontal pins working in pairs of vertical slots, at least one of said pins being provided on the prop and at least one pair of slots being provided on the tongue behind the [eye] *means for detachably interconnecting the rear end portion of said ramp with said tongue,* these slots being open at their lower ends for egress and ingress of said pin, the structure including guide surfaces on opposite sides of said slot at the entrance to said slots to guide the pin into the slots after uncoupling when the tongue is to be supported again on the prop.

26. An automatic coupling as set forth in claim 1, including means operative when said first mentioned guide means arrives over the swivel support to offer added resistance to final relative endwise movement between the tongue and ramp members to give added impetus to swing said ramp upwardly just before completion of the coupling operation.

27. An automatic coupling as set forth in claim 26, wherein the resistance causing means comprises a ridge on the ramp transversely thereof over the swivel support arranged to be engaged and run over by the guide means on the front end portion of the tongue near the end of the coupling operation.

28. An automatic coupling as set forth in claim 26, wherein the resistance causing means comprises a weight on the latch which increases its resistance to being raised by cam action in riding over the keeper projection near the end of the coupling operation.

29. An automatic coupling as set forth in claim 26, wherein the resistance causing means comprises a weight on the latch which increases its resistance to being raised by cam action in riding over the keeper projection near the end of the coupling operation, there being adjustable stop means predetermining the initial level of the latch in relation to the top of the keeper projection, whereby to vary the resistance and accordingly vary the impetus to swing the ramp upwardly and horizontally just before completion of the coupling operation.

*30. An automatic coupling as set forth in claim 1 wherein the keeper is in the form of a projection on the forward end portion of one of said tongue and ramp members and the latch is pivoted on a horizontal axis transversely relative to the front end portion of the other of said members and is arranged to hook over said projection in the coupling operation.*

*31. An automatic coupling as set forth in claim 1 wherein the last mentioned means comprises an eye extending downwardly from the tongue in such rearwardly spaced relation to said keeper and latch in relation to the length of said ramp that the rear end portion of said ramp is engageable in said eye in the final relative endwise movemen of the tongue and ramp members at the end of the coupling operation.*

*32. An automatic coupling as set forth in claim 1 including means holding the latch non-positively in engagement with the keeper projection, said latch being disengageable manually in uncoupling.*

*33. An automatic coupling as set forth in claim 1, wherein the keeper is on the forward end portion of one of said tongue and ramp members and the latch cooperating with the keeper is carried on the front end portion of the other of said members and is arranged to engage said keeper to couple said members in parallel relationship, thereby coupling the two things together.*

References Cited

The following references, cited by the Examiner, are of record in the patented file of this patent or the original patent.

UNITED STATES PATENTS

| | | | |
|---|---|---|---|
| 1,862,112 | 6/1932 | Davis | 280—430 |
| 2,020,161 | 11/1935 | Robb | 280—429 X |
| 2,464,424 | 3/1949 | Weldon et al. | 280—477 |
| 2,671,673 | 3/1954 | Benson | 280—477 |
| 2,810,590 | 10/1957 | Grant | 280—429 |
| 2,844,390 | 7/1958 | Smith | 280—477 |
| 2,879,080 | 3/1959 | Sarver | 280—478 |

LEO FRIAGLIA, *Primary Examiner.*